US005597652A

United States Patent [19]

Utsunomiya et al.

[11] Patent Number: 5,597,652

[45] Date of Patent: Jan. 28, 1997

[54] CONDUCTIVE ROLL

[75] Inventors: Tadashi Utsunomiya; Yoshinori Shimokawa; Minoru Toyoda, all of Kanagawa-ken, Japan

[73] Assignee: Bridgestone Corporation, Tokyo, Japan

[21] Appl. No.: 270,521

[22] Filed: Jul. 5, 1994

Related U.S. Application Data

[63] Continuation-in-part of Ser. No. 752,556, Sep. 4, 1991, abandoned.

[30] Foreign Application Priority Data

Jan. 12, 1990 [JP] Japan .................................... 2-5845

[51] Int. Cl.$^6$ ................................................ B32B 25/00

[52] U.S. Cl. ...................... 428/382; 428/391; 428/380; 428/404; 428/383; 427/387; 427/340; 524/409; 524/451; 524/264

[58] Field of Search .................. 29/110, 60; 427/407.1, 427/387, 409, 53, 4, 10; 428/36.5, 447, 446, 375, 390, 389, 391, 380, 382, 400, 407, 383; 355/219, 271, 277, 264; 524/409, 410, 430, 574, 451; 525/427; 432/60; 118/60; 401/19, 208, 218

[56] References Cited

U.S. PATENT DOCUMENTS

| | | | |
|---|---|---|---|
| 2,804,678 | 9/1957 | Rockoff | 524/574 |
| 2,972,540 | 2/1961 | Saner et al. | 525/427 |
| 3,574,149 | 4/1971 | Harrington | 524/409 |
| 4,074,001 | 2/1978 | Imai et al. | 427/407.1 |
| 4,312,693 | 1/1982 | Salensky et al. | 427/536 |
| 4,313,981 | 2/1982 | Namik | 29/110 |
| 4,372,246 | 2/1983 | Azar et al. | 427/407.1 |
| 4,379,630 | 4/1983 | Suzuki | 355/3 TR |
| 4,419,475 | 12/1983 | Vostovich | 524/409 |
| 4,431,764 | 2/1984 | Yoshizumi | 524/409 |
| 4,444,864 | 4/1984 | Takahashi | 430/120 |
| 4,485,198 | 11/1984 | Hamed | 29/110 |
| 4,576,845 | 3/1986 | Krotchko | 29/110 |
| 4,655,966 | 2/1987 | Guillaumon et al. | 524/410 |
| 4,891,248 | 1/1990 | Kraus | 427/407.1 |
| 4,922,299 | 5/1990 | Uchimoto et al. | 355/219 |
| 4,938,827 | 7/1990 | Leach et al. | 427/536 |
| 4,959,688 | 4/1990 | Koitabashi | 355/219 |
| 4,985,510 | 1/1991 | Akiyama et al. | 525/427 |
| 5,017,965 | 5/1991 | Hashimoto et al. | 355/219 |
| 5,063,082 | 11/1991 | Adell | 427/409 |
| 5,177,534 | 1/1993 | Kisu et al. | 355/219 |

FOREIGN PATENT DOCUMENTS

| | | | |
|---|---|---|---|
| 3081135 | 4/1991 | Japan | 29/110 |

*Primary Examiner*—Merrick Dixon
*Attorney, Agent, or Firm*—Jordan and Hamburg

[57] ABSTRACT

The conductive roll accordin g to the present invention can be used for develop ing, charging, destaticizing and transferring images of electrophotography as the roll can be tightly contacted against a photosensitive member for uniform charging of the potential. The conductive roll is constructed to minimize contamination of the photosensitive member. The conductive roll includes a highly conductive shaft provided at the core, an intermediate layer provided on the outer peri phery of the shaft and is made of a conductive and elastic material or a foamed member of such material, and a coated film layer provided on the outer periphery of the intermediate layer having a high resistance.

17 Claims, 9 Drawing Sheets

CONDUCTIVE ROLL

This application is a continuation-in-part of application Ser. No. 07/752,556, filed Sep. 4, 1991, now abandoned.

BACKGROUND OF THE INVENTION

1. Field of the Invention

The present invention relates to a conductive roll for developing, charging, destaticizing and transferring images to be used in an electrophotographic recording device. More particularly, it relates to a conductive roll of rubber or foamed material and comprises a core made of a highly conductive metal shaft and a coated film layer formed on the outer periphery thereof for controlling the resistance, and a method for manufacturing the same.

Electrophotographic recording devices widely used in copying machines and laser beam printers generally comprise a photosensitive member, on which static latent images are formed by charging and exposing the photosensitive member. A toner is used to develop a latent image on the photosensitive member by causing the toner to be absorbed. The toner adhered on the image is then transferred onto a sheet of transfer paper. By destaticizing the photosensitive member to a predetermined level of potential and by wiping out the residual toner thereon, the photosensitive member is ready for subsequent recording. The toner transferred to and carried by the paper is eventually fixed thereon as it becomes fused and pressed against the paper, whereby recording of images on the paper is completed.

As a means to charge the photosensitive member of the electrophotographic recording device to a predetermined level of potential, to apply a predetermined level of potential to the transfer paper conveyed into the transfer zone for image transfer, or to uniformly charge to a predetermined level the charged zone of the photosensitive member after image transfer, corona discharge means comprising a thin wire to which is applied a high voltage of several hundreds to several thousands of vol tage has been widely utilized.

This type of corona discharge means is defective in that active molecules such as ozone generated during corona discharged may deteriorate the photosensitive member and other parts or adversely affect the human body. Use of high voltage also entails the danger of electrification as well as the problems of maintenance and servicing of the damaged or broken wire.

To overcome these problems, a contact charge means of a roller type (hereinafter referred to as a conductive roll) has been proposed which made of a conductive rubber roller and is directly contacted with the photosensitive member to apply predetermined level of voltage. The roll offers excellent features such as that it does not require high voltage as in the corona discharge means and ozone generation is almost negligible.

An important aspect of the conductive rollis that a highly close contact between the roll and the photosensitive member is essential in order to charge the latter uniformly at a given potential.

Development of an effective means for that purpose has been awaited.

To improve the close contact, a softening agent in the form of a liquid substance of a low moleculer weight such as oil is mixed the starting material for the roll. However, the softening agent would migrate onto the rolls surface and spoil the photosensitive member.

To make the roll electroconductive, an electroconductive carbon powder such as Ketjenblack EC and acetylene black is added. However, even slight changes or irregularity in the powder addition may vary the electric resistance greatly.

The conventional conductive roll is further defective in that it is difficult to control and regulate the electric resistance. It is also difficult to give the roll the required dielectric strength characteristics.

The electric resistance of the conductive roll is susceptible to changes in environmental conditions such as humidity and temperature, making it difficult to charge the photosensitive member at a constant level of potential.

The conventional conductive roll can be very brittle and susceptible to cracks and wear depending on the material. Development of conductive roll with little chronological changes has also been awaited.

To manufacture a conductive roll, a roller 100 made of rubber or foamed urethane is coated with a liquid coating material by a wet or dry process such as electrostatic coating, dipping or rolling as shown in FIG. 1. After drying, a coated film layer 101 for controlling the resistance is formed thereon (FIG. 2). In order (1) to prevent the coating material from adhering to the shaft 102, and (2) to form the end portion of the coated film layer 101 as shown in FIG. 2, it is the general practice to mask the shaft 102 with a tube 103 whose outer diameter a is the same as that of said end portion and whose inner diameter is substantially the same as the outer diameter bof the shaft 102 (FIG. 3). After applying the coating material with the shaft 102 being thus masked and drying the coating material, or alternatively after coating by a dry process, the coated film layer 101 as shown in FIG. 4 is cut at the portion c and the masking tube 103 is removed to obtain a roll as shown in FIG. 2.

To prevent sparking between the photosensitive drum and the roller made of rubber or foamed material having a very low electric resistance, it is necessary for the coated film layer to project beyond the roll end by a considerable length. But if the extended portion is too long, the film layer may come in contact with the bearing and become torn.

If there exists air between the tube and the roll during extrusion of the film layer, the air may collect and produce a swell, deteriorating the dielectric strength of that particular portion. Moreover, a trace of air present between the masking tube 108 and the shaft 102 or between the tube 108 and the end portion of the roller 100 is likely to permeate into the film layer at the end of the roller 100 and form pinholes 101*a* (FIG. 5), making the film layer 101 susceptible to cut (FIG. 6).

When there are pinholes 101*a* or if the edge of the film later 101 becomes flush with the end face of the roller 100 as the film is cut, spark discharge is likely to occur at this portion of the roller 100, damaging the photosensitive drum.

The present invention was contrived to overcome these defects encountered in the prior art, and aims at providing an electroconductive roll which contacts closely with the photosensi live member, is least likely to contaminate the photosensitive member, minimizes fluctuations of electric resistance caused by environmental changes, and is less likely to become cracked or worn out for an extended period of time. The present invention also aims at providing a method for manufacturing such conductive rolls.

SUMMARY OF THE INVENTION

In the electroconductive roll of the present invention, liquid rubber admixed in solid rubber is reacted and becomes bonded with the latter during vulcanization, to thereby prevent migration onto the resul rant roll surface. This in turn improves the contact between the resultant rubber roll and the photosensitive member and prevents adhesion of various pollutants thereto. A tube having an outer diameter smaller than the outer diameter of the roll end is inserted over the shaft for masking prior to forming the coated film layer, so that sump for receiving liquid can be formed at the boundary between the roll end and the cap end where bubbles are likely to occur to thereby contain bubbles and prevent formation of pinholes. This in turn prevents the coated film layer from breaking.

Halogenation of the surface of the conduct ive rubber member facilitates control of the electric resistance in the conduct ive rubber member.

Polarization of the surface of the intermediate layer in the conductive rubber member ensures firm adhesion of the polarized coated film layer.

PREFERRED EMBODIMENT OF THE INVENTION

Embodiments of the present invention will now be described referring to the accompanying drawings.

Figure 1:
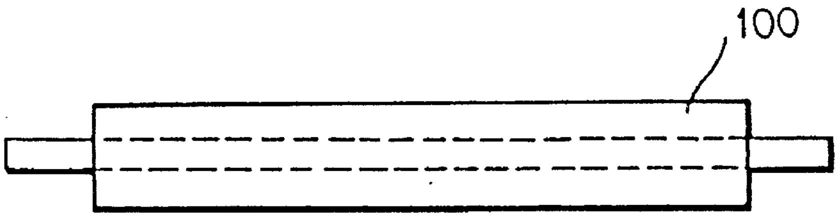
FIG. 1 (PRIOR ART)
FIGS. 1 through 4 show the process of manufacturing a prior art conductive roll.
Figure 2:
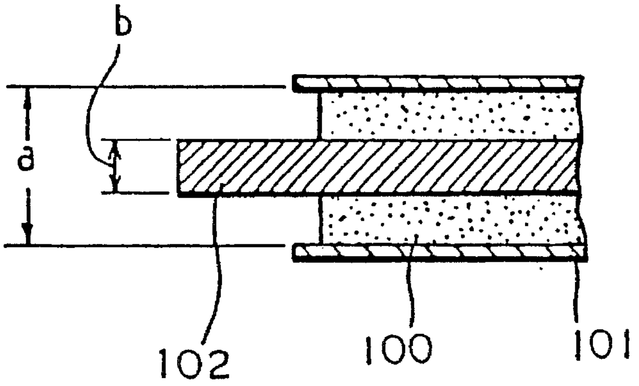
FIG. 2 (PRIOR ART)
Figure 3:
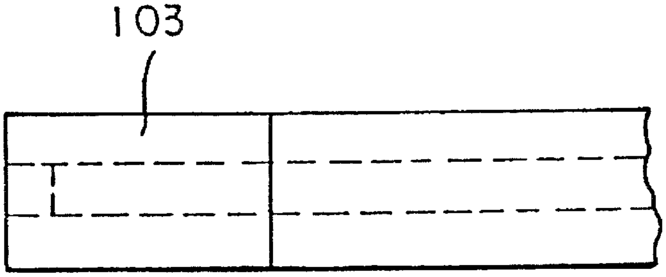
FIG. 3 (PRIOR ART)
Figure 4:
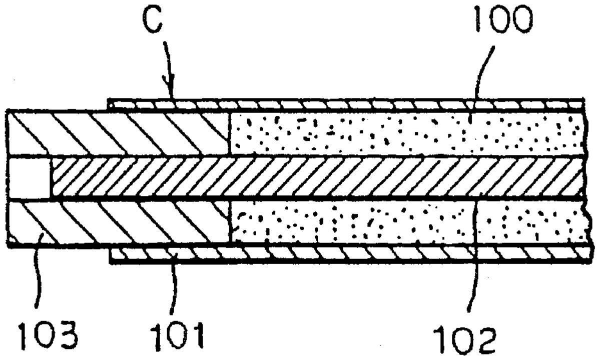
FIG.4 (PRIOR ART)
Figure 5:
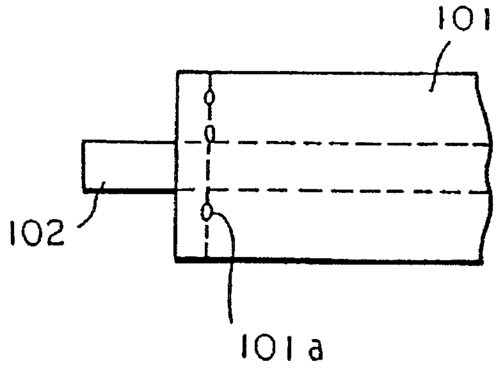
FIG.5 (PRIOR ART)
FIGS. 5 and 6 are explanatory views to illustrate defects of the prior art conductive roll.
Figure 6:
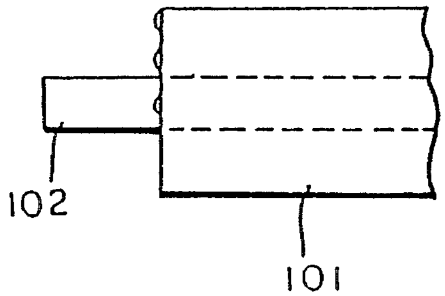
FIG.6 (PRIOR ART)
Figure 7:
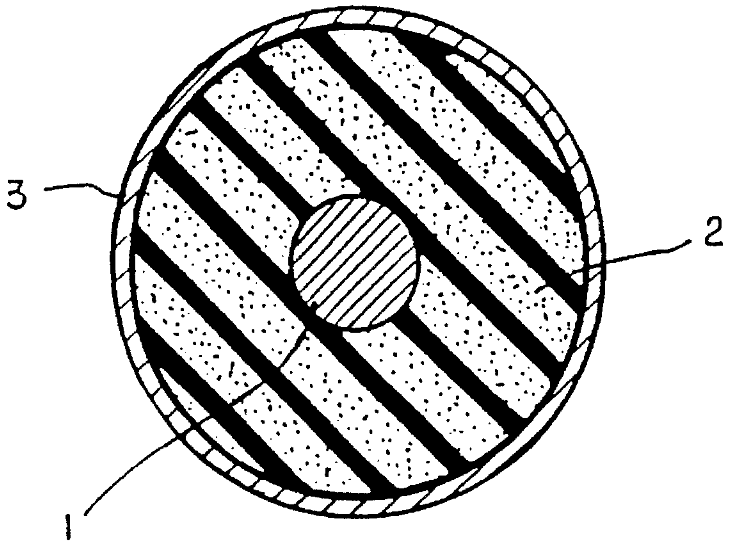
FIG. 7 is a sectional view of the first embodiment according to the present invention.

FIG. 7 shows the first embodiment of the present invention. The electroconductive roll shown is to be used in an electrophotographic recording device as a charger and comprises a shaft 1, a flexible intermediate layer 2, and coated film layer 3.

The shaft 1 is provided at the core of the conductive roll along the axial direction it is cylindrical and made of a highly conductive material.

To improve contacting property of the intermediate layer 2 with the photosensitive member formed as a drum (hereinafter a photosensitive drum), the layer 2 is made of solid rubber blended with 10 to 50 PHR of liquid rubber as the softening agent (hereinafter rubber roll). That is, the rubber roll 2 is made of a solid polybutadiene rubber and liquid poly isoprene rubber (hereinafter IR). More specifically, the rubber roll 2 comprises 60 PHR cis-1, 4-polybutadiene (BRO2LL manufactured by Nippon Synthetic Rubber), 40 PHR of liquid polyisoprene (LIR 30 by Kuraray Isoprene) and 10 PHR of Ketjenblack EC.

Liquid rubber used in the present invention preferably has double bonds at the main chains and an average molecular weight of 10,000 or more. Liquid rubber having the molecular weight of this size reacts with solid rubber during vulcanization and becomes bonded to eliminate risks of its becoming dissolved in paint. Because its high molecular weight, unreacted portions of the liquid rubber will not easily become dissolved in paint. If the rubber roll 2 comprising such types of rubber is used to form a coated film layer 3 thereon by covering its outer surface with paint, the softening agent would not migrate onto the coated film layer surface. When the rubber roll 2 is pressed against the photosensitive drum, there is less risk of soiling the drum. Both liquid IR and liquid BR may be used in the present invention, but liquid IR is more preferable. Combined use of solid BR and liquid IR offers the merits that (1) softer rubber can be obtained, (2) adhesion of the mixture to the Banbury mixer or to the roll prevented even if the ratio of liquid IR in the blend is high, (3) the mixture is easily released from a mold during vulcanization, (4) vulcanization proceeds quickly, and (5) permanent strain due to compression of the vulcanized product is small.

The high electric resistance of rubber material must be lowered in some way or other prior to its use as a material for the rubber roll (hereinafter a conductive rubber member). The conductive rubber member in this embodiment obtained by mixing the rubber material with various metal oxides such as Ketjenblack EC, zinc oxide, titanium oxide, tin oxides or carbon black to lower the electric resistance.

Depending on the use of the product rubber roll, the resistance must be restricted to a very narrow range of from $10^4$ to $10^7$ $\Omega$, i.e. that of semiconductor. If a conductive carbon such as Ketjenblack and acetylene black is used, even very slight fluctuations in its addition amount or non-uniform dispersion thereof would result in a significant change in the resistance, making it difficult to control the resistance to be within predetermined range. Stable resistance can be obtained if carbons of lower structure generally used for rubber such as SAF, ISAF, HAF, MAF, FEF, GPF and SRF are used. To lower the resistance, a large amount of carbon must be blended, increasing the hardness of rubber. In order to obtain a rubber which is low in hardness and has low resistance characteristics, combined use of a conductive carbon such as Ketjenblack and acetylene black with the ordinary carbon for rubber or paint is effective. Use of the above mentioned conductive metal oxides also effective for obtaining a rubber material which is low in hardness and has a limited range of resistance falling within the semiconductor range, although the cost becomes substantially high. This is because the conductive metal oxides do not act as a reinforcement, and their conductivity is not as high as the conductive carbons.

The intermediate layer is not limited to that disclosed in this embodiment. Solid elastomers and foaming elastomers such as silicone rubber, urethane rubber, BR base rubber, and polynorbornane may also be used. The coated film layer 3 may be made of various substances such as epichlorohydrin, acrylic rubber, adhesive silicone rubber, chlorosulfonated polyethylene, fluoroolefin-vinyl ether copolymer, one-component or two-component polyurethane, and modified nylons such as N-methoxymethyl nylon. These substances can be bonded to the rubber surface which has been polarized. They may give the coated film layer 3 a predetermined resistance by themselves, but if not, a conductive powder may be added to adjust the resistance.

These materials mentioned above as suitable for the intermediate layer 2 in Embodiment 1 are less sticky and can be easily removed from the kneader or Banbury mixer after kneading. They can also be easily released from the mold after volcanization without damaging the resultant roll.

The present invention conductive roll may be manufactured by either the wet or dry coating process. As the liquid rubber will not migrate into the coated film layer even when applied by the dry process, it is not necessary for the coated film layer to have a preventive action against migration of contaminants onto the photosensitive drum. This in turn enables a wider selection of the film materials.

Figure 8:
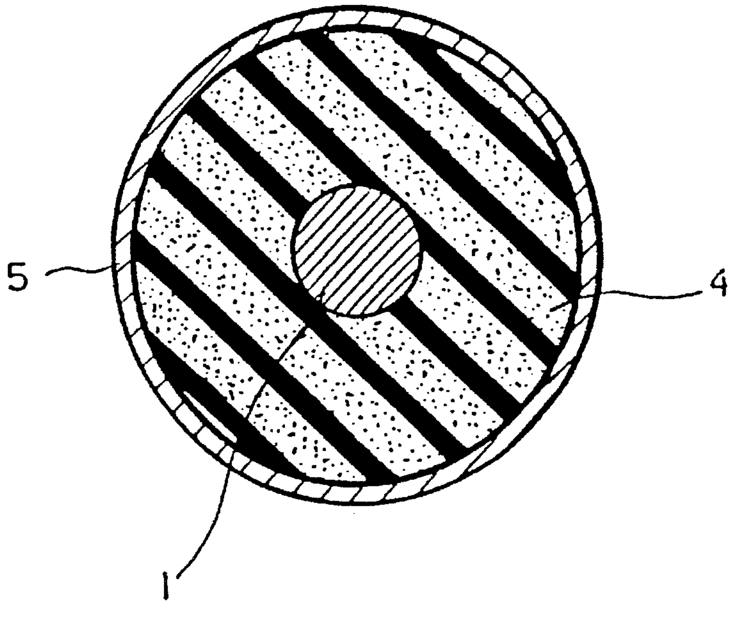
FIG. 8 is a sectional view of the second embodiment.

The second embodiment of the present invention will now be described,

FIG. 8 shows the second embodiment of a conductive roll according to the present invention. The rubber roll 4 which is the intermediate layer is halogenated on its surface with halogan gas such as chlorine gas, or an organic halogenation agent such as N,N-dichloro-p-toluen-sulfonic amide, trichloroisocyanurate to increase the electric resistance of the rubber roll 4. By halogenating the rubber roll 4, its initial electric resistance of for example, $10^3$ Ω or less can be increased to approximately $10^4$ Ω. The resistance can be further. increased to approximately $10^5$ to $10^7$ Ω if the conductive powder for adjusting the resistance of Embodiment 1 is combined with the starting material. The surface of the rubber roll 4 is subjected to halogenation or polarization such as by corona discharge or plasma discharge during the manufacture process.

The coated film layer 5 in the second embodiment is made of a polar material such as urethane, nylon, epichlorohydrin rubber or acrylic rubber, so that the film can be easily bonded to the polarized surface of the rubber roll 4. These materials may be coated on the rubber roll 4 by either the wet or dry process. In either case, the bonding of the rubber roll 4 with the coated film 5 suppresses chronological changes and fluctuations in the electric resistance.

Thus, with the conductive roll according to the second embodiment, the ratio of resistance between the rubber roll 4 and the coated film layer 5 can be freely controlled to obtain a conductive roll having a predetermined resistance, so long as the inner resistance of the rubber roll 4 of the intermediate layer can be controlled. The voltage acting on the entire conductive roll during use will be distributed to the intermediate layer and the film layer 5 proportionally to the ratio of resistance. Thus, in case the coated film layer 5 does not have sufficient dielectric strength, the dielectric strength of the conductive roll as a whole can be increased by increasing the ratio of inner resistance of the intermediate layer.

Figure 9:
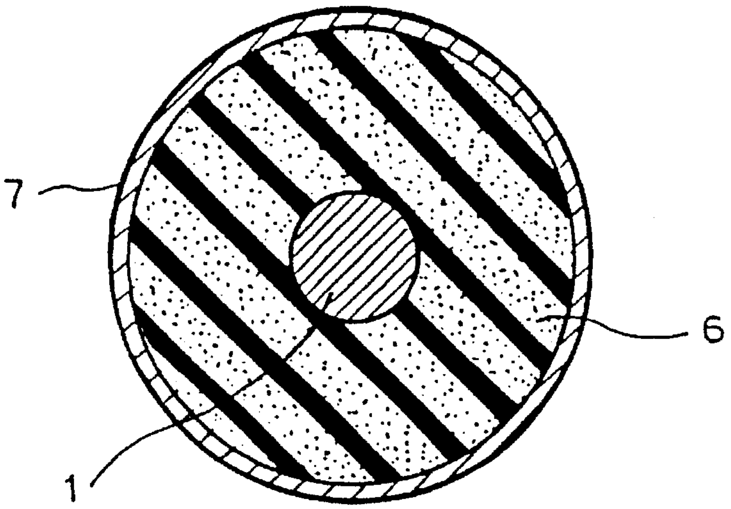
FIG. 9 is a sectional view of the third embodiment.

The third embodiment of a conductive roll according to the present invention will now be described referring to FIG. 9.

The conductive roll according to the third embodiment comprises a rubber roll 6 as the intermediate layer which is made elastic by softening material of the first embodiment, and a coated film layer 7 which is made of a one-component polyurethane.

The coated film layer 7 made of one-component urethane can be firmly bonded to the rubber roll 6 which has been subjected to softening treatment. It is known that ester base urethane or ether base urethane added with a conductive powder to have an appropriate resistance is particularly effective in giving high dielectric strength. For example, conductive rolls having a volume specific resistance of approximately $10^8$ to $10^{10}$ Ω and the film thickness of 100 to 200 μm have the dielectric strength characteristics of approximately 1.5 to 2.5 KV. Conductive metal oxides such as zinc oxides, titanium oxides or tin oxides, or a conductive powder such as carbon black is added and dispersed in the starting material to adjust the resistance of the film layer 7. Instead of a highly conductive carbon black such as Ketjenblack EC or acetylene black, ordinary carbons for rubber or paints such as SAF, ISAF, HAF, MAP, and FEF that have the DBP oil absorption of 150 or less (ASTM D2414) may be used to control the volume specific resistance of the film layer to be in the semiconductor range of from to $10^6$ to $10^{10}$ Ω. Result of experiments conducted by the present inventors indicates that an ester base one-component urethane paint dispersed with a carbon black for paints having the DBP oil absorption of 50 to 180 gives the film layer with a stable resistance since the carbon black that has been treated on the surface to be acidic is particularly compatible with urethane and disperses well in the urethane paint.

Figure 10:
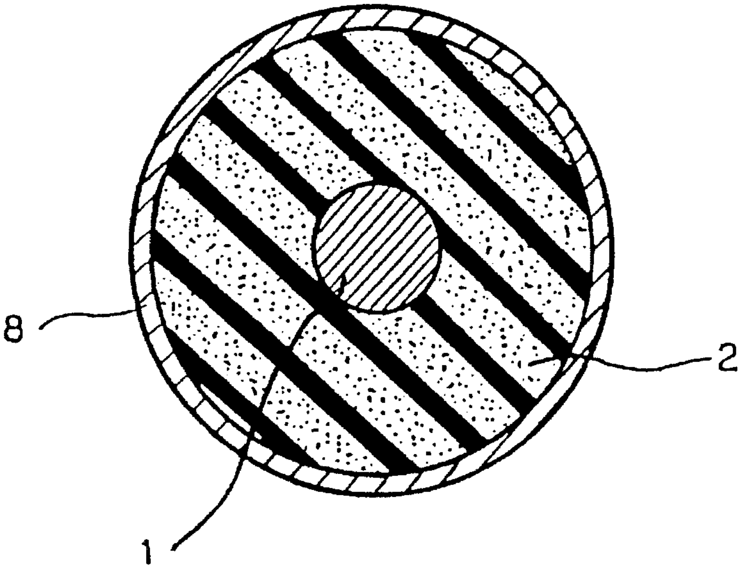
FIG. 10 is a sectional view of the fourth embodiment.

The fourth embodiment of a conductive roll according to the present invention will now be described refferring to FIG. 10.

The fourth embodiment of the conductive roll includes the coated film layer 8 which is added with a hydrophobic silica.

Generally, the resistance of the coated film layer depends largely on the environment, and the value may deviate from the adequate range even when exposed to the normal environmental conditions of its use.

The inventors have found, as a result of repeated attempts, that an addition of 5 to 50 PHR of hydrophobic silica (silica chemically bounded with silicone oil) to the paint is effective in preventing fluctuation of the resistance. This because silicone oil gives waterrepellent property to the entire coated film layer. Addition of silicone oil as it is to the coated film layer causes problems as the oilmay blled and soil the photosensitive drum. However, silicone oil chemically bonded with silica will not bleed and can be favorably used for the purpose.

Figure 11:
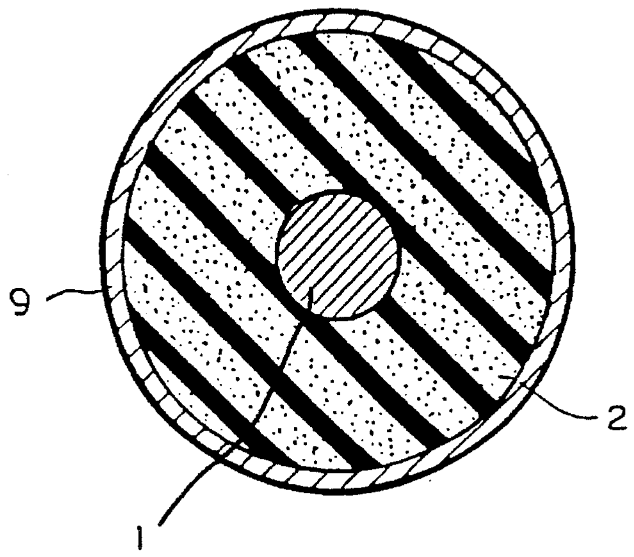
FIG. 11 is a sectional view to show the fifth embodiment.

The fifth embodiment of the present invention will now be described-referring to FIG. 11.

The fifth embodiment comprises a coated film layer 9 which is added with conductive tin oxides doped with antimony oxides as the conductive powder for adjusting the resistance of the film.

Furthermore, the electroconductive roll according to the fifth embodiment may be made of electroconductive titanium oxides, in place of the tin oxides as the electroconductive powder for adjusting the resistance of the coating 9. The electroconductive titanium oxides used for this purpose are of a type made of rutile titanium oxides of 0.2 to 0.3 μm in grain size as the base component and of which the surface is coated with an electroconductive layer of tin oxides. Since the rutile titanium oxides are highly dispersible because the grain size is so small, the resistance of the coating 9 is easily controllable by appropriately changing the dispersibility. Moreover, since the grain of the titanium oxides is spheric, the anisotropy in resistance of the coating 9 due to the shear force applied to the titanium oxides grain during manufacture of the electroconductive roll will not easily arise, so the electroconductive roll according to the present invention works with excellent characteristics. Also, the electroconductive tin and titanium oxides may be used as appropriately mixed together.

The conductive roll according to the fifth embodiment includes tin oxides or titanium oxides of an extremely excellent disparsing property because of its extremely small grain size of 0.1 film or smaller, and therefore by suitably controlling its addition, the resistance in the coated film layer 9 can be easily controlled.

As the grains of tin oxide are spherical in shape, the resistance of the film layer is less likely to show anisotropicity due to changes in the shear during processing, and the resultant roll will have excellent characteristics.

Figure 12:
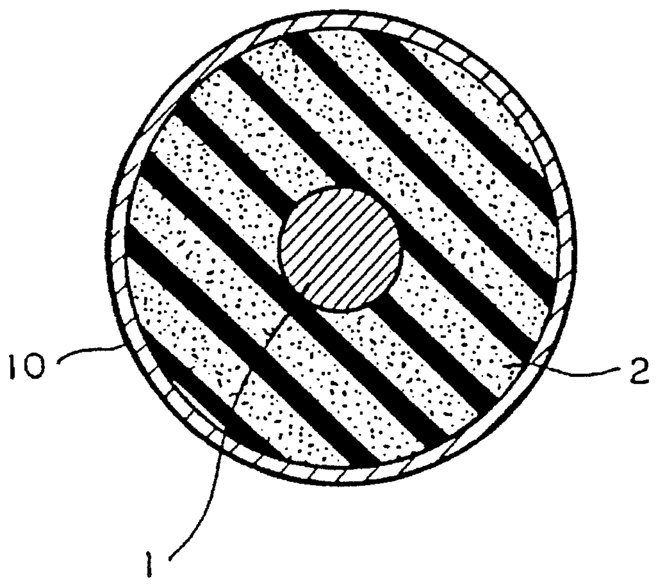
FIG. 12 is a sectional view of the sixth embodiment.

The sixth embodiment of a conductive roll according to the present invention will now be described referring to FIG. 12.

The conductive roll 6 according to the sixth embodiment includes a coated film layer 10 which is made of a modified nylon such as N-methoxymethyl nylon.

The inventors have conducted a number of experiments using the conductive roll according to the sixth embodiment and have found out that, even when a photosensitive drum was tightly contacted with the coated film layer 10 and left standing for one month, no contamination of the drum was observed.

Figure 13:
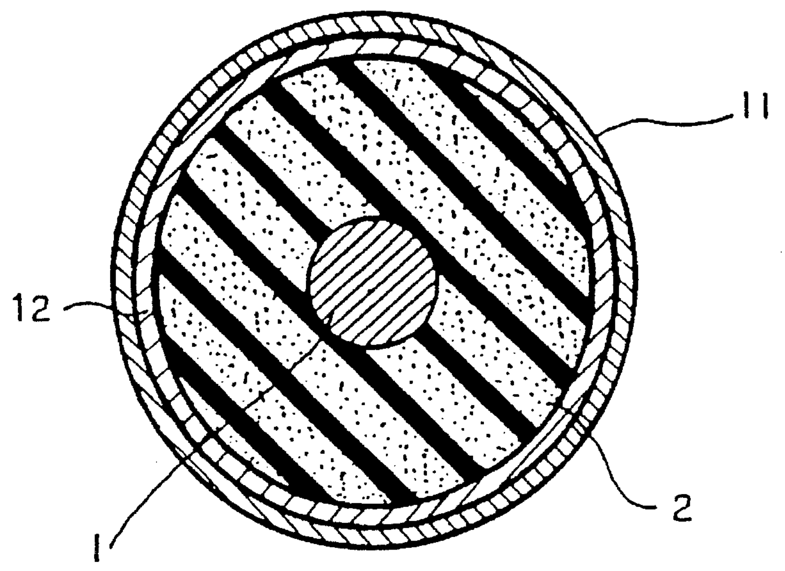
FIG. 13 is a sectional view of the seventh embodiment.

The seventh embodiment of a conductive roll according to the present invention will now be described referring to FIG. 13.

The conductive roll according to the seventh embodiment includes an upper layer 11 and a lower layer 12 as the coated film layer.

The upper layer 11 is obtained by forming a thin layer of approximately 1 to 20 μm with a material which will not soil the photosensitive drum even if it may be somewhat harder than desirable low in the dielectric strength. The upper layer 11 is made of a modified nylon such as N-methoxymethyl nylon dispersed with tin oxides which in turn is doped with antimony oxides. The upper layer 11 of this composition will not give adverse effects on the images during recording thereof even if exposed to changes in the environmental conditions such as humidity (e.g. 82.5% RH at 32.5° C. to 10% RH at 15° C. ). Although modified nylons such as N-methoxymethyl nylon are a suitable for the upper layer 11 as mentioned above, they are defective in that (1) if these materials do not crosslink at all, they slightly stick to the photosensitive drum, (2) if they crosslink too much, the film layer becomes too brittle and easily worn, or (3) cracks may easily occur on the surface to deteriorate the dielectric strength.

By adequately controlling the degree of crosslinking in the coated film layer, for example by the use of acidic catalyst or by heating, the defects mentioned above can be significantly improved.

The lower layer 12 is made of a material which is soft and excellent in dielectric strengths, and which does not permit permeation of substances contaminating the rubber or forming material used as the intermediate layer 2. The lower layer 12 is formed by coating such material for the thickness of 50 to 200 μm. One-component or two-component polyurethane, epichlorohydrin rubber, acrylic rubber, chlorosulfonated polyethylene and modified nylon are particularly sui table as the material for the lower layer 12 of this embodiment.

As for the volume resistivity of the upper layer 11 and thelower layer 12 of the coated film layer, it is desirable that the following formula holds given the resistance $R_1$ of the upper layer and the resistance $R_2$ of the lower layer 12, $$(R_2/R_1)<1$$

This would effectivity decrease the adverse effects caused by the temperature and humidity. Furthermore, the hardness of the upper layer 11 ranges from Shore D 50 to 100, while that of the lower layer 12 ranges within Shore D 80 or less.

Figure 14:
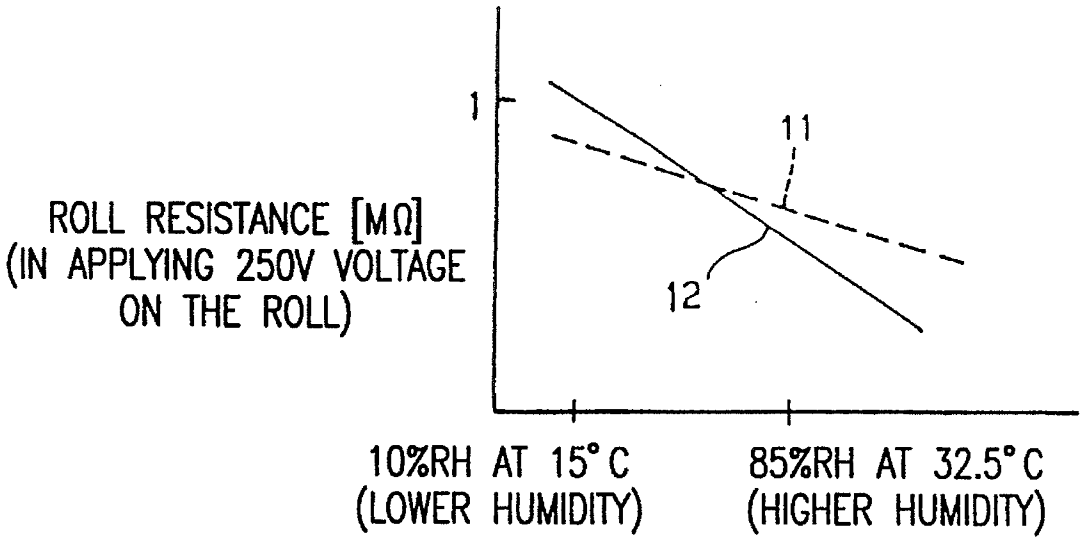
FIG. 14 is a graph showing temperature and humidity dependent changes in the electric resistance in the upper and lower layers of the coated film layer of the seventh embodiment shown in FIG. 14.

The conductive roll according to the seventh embodiment is therefore less dependent on the environmental conditions as the coating film comprises a lower layer 12 and an upper layer 11 which is thinner than the lower layer and has a lower volume resitivity. In other words, as shown in FIG. 14, the contact resistance of the lower layer 12 which increases at lower humidities can be lowered by the presence of the upper layer 11 which has a lower resistance. (Note that FIG. 14 is a one-side log scale graph, and that the roll resistance on the vertical axis is shown in logarithms.)

The conductive roll according to the eighth embodiment will be described referring FIG. 15.

The conductive roll according to the eighth embodiment includes an intermediate layer 16 not shown and a coated film layer 17 not shown that are adjusted to have the ratio of resistance of of 1:1.5.

The intermediate layer 16 is obtained by injection molding a mixture containing polybutadiene, liquid polyisoprene and carbon. The roll resistance (measured by winding 0.1 cm wide aluminum foil sheet applying 1 KV voltage on the roll) is $1\times10^3$ Ω.

The coating layer 17 is formed by coating the outer periphery of the intermediate layer 16 with an 80 μm thick layer of polyurethane paint containing carbon. Similarly, the roll resistance is set at $1.5\times10^3$ Ω.

When a high voltage of 1.5 KV is applied between the intermediate layer 16 and the coated film layer 17 of the conductive roll according to the eighth embodiment, no voltage breakdown occured in the roll.

The ninth embodiment of a conductive roll according to the present invention will now be described referring to Table 1.

In the ninth embodiment, (a) an intermediate layer of solid rubber containing (a) liquid rubber as a softening agent and (b) an intermediate layer of solid rubber containing no liquid rubber were added with (c) a conductive carbon or Ketjenblack EC and (d) a nonconductive carbon or HAF, and the hardness and resistance were measured. The measurements are shown in Table 1.

Table 1 indicates that (1) combined use of solid rubber andliquid rubberlowers the hardness and stabilizes the resistance, (2) when 70 PHR of polybutadiene and 30 PHR of liquid polyisoprene (LIR) are used as the liquid rubber, the resultant roll will have a lower resistance even if the amount of carbon addition is small.

Thus, a vulcanized rubber which is soft and has excellent conductivity can be obtained in the ninth embodiment.

In the case (a) of the ninth embodiment wherein liquid rubber was used, the intermediate layer was obtained by kneading 70 PHR of polybutadiene (BR) and 30 PHR of liquid polyisoprene (LIR), subjecting the resultant product to press molding and then forming into a sheet to measure the hardness and resistance. In case (b) where no liquid rubber is used, the intermediate layer was obtained by kneading styrene butadiene rubber (SBR), natural rubber (NR) and carbon black in a Banbury mixer, subjecting the resultant product to press vulcanization and formig into a sheet to measure the hardness and the resistance.

TABLE 1

| | | Carbon | | | Volume | |
|---|---|---|---|---|---|---|
| | Experiment | Ketjen-black EC | HAF | Hardness (Asker C) | volume resistivity (Ω · cm) | Rubber composition |
| (a) | 1 | 4 | — | 42 | $9.3\times10^6$ | BR/LIR:70/30 |
| | 2 | 5 | — | 43 | $4.4\times10^5$ | " |
| | 3 | 6 | — | 43 | $4.7\times10^5$ | " |

TABLE 1-continued

| | Experi-ment | Carbon Ketjen-black EC | HAF | Hardness (Asker C) | Volume volume resistivity (Ω · cm) | Rubber composition |
|---|---|---|---|---|---|---|
| | 4 | 7 | — | 43 | $1.5 \times 10^4$ | " |
| | 5 | 8 | — | 43 | $6.2 \times 10^3$ | " |
| | 6 | 3 | 9 | — | $1.6 \times 10^6$ | " |
| | 7 | 3 | 10 | — | $1.3 \times 10^6$ | " |
| | 8 | 3 | 11 | — | $8.0 \times 10^5$ | " |
| | 9 | 3 | 12 | — | $7.0 \times 10^5$ | " |
| | 10 | 5 | 5 | 47 | $1.3 \times 10^5$ | " |
| | 11 | 5 | 10 | 48 | $1.4 \times 10^5$ | " |
| | 12 | 5 | 15 | 50 | $1.3 \times 10^4$ | " |
| | 13 | 5 | 20 | 54 | $4.4 \times 10^3$ | " |
| | 14 | — | 40 | 62 | $4.9 \times 10^3$ | " |
| | 15 | — | 50 | 65 | $2.7 \times 10^3$ | " |
| | 16 | — | 60 | 67 | $1.5 \times 10^3$ | " |
| (b) | 17 | — | 45 | 44* | $2.5 \times 10^7$ | NR/SBR:52/48 |
| | 18 | — | 45 | 63* | $3.9 \times 10^6$ | NR |
| | | (c) | (d) | | | |

*JISA hardness

The tenth embodiment of a conductive roll according to the present invention will now be described referring to Table 2.

The conductive roll according to the tenth embodiment includes an intermediate layer whose surface is polarized. The intermediate layer of this construction was subjected to two types of treatment, i.e. (1) immersed two times in a 4% acetone solution of trichloroisocyanurate (f). The roll resistances (measured by winding a 1 cm wide aluminium foil sheet and applying 1 KV of voltage to the roll) before and after immersion were measured. The result is shown in Table 2.

Table 2 indicates that polarization treatment is effective in increasing the volume resistivity. In other words, resistance in the intermediate layer can be controlled. This is because the intermediate layer is impregnated with the treatment solution and a polarized layer of several tens of microns is formed on the surface.

The polarization treatment also lowers stickiness of the surface to thereby prevent dusts from adhering thereto, and making adhesion of the intermediate layer with the coated film layer easy.

The intermediate layer used in the case (e) of this embodiment is obtained by kneading 60 PHR of cis-1, 4-polybutadiene (BRO2LL by Nippon Synthetic Rubber), 40 PHR of liquid polyisoprene (LIR30 by Kuraray Isoprene), 10 PHR of Ketjenblack EC (by Ketjenblack International) and vulcanizing agent in a B-type Banbury mixer, and then injection-molding the resultant mixture.

TABLE 2

| Experiment No. | Resistance before treatment | Resistance after treatment | Treatment |
|---|---|---|---|
| 1 | $2 \times 10^3$ Ω | $1.0 \times 10^4$ Ω | (e) |
| 2 | $1 \times 10^4$ Ω | $1.0 \times 10^5$ Ω | (f) |

The eleventh embodiment of a conductive roll 11 according to the present invention will now be described.

The intermediate layer according to the eleventh embodiment was obtained by mixing polybutadiene, liquid polyisoprene, carbon black and a vulcanizing agent, and then injection-molding the mixture. The resultant layer was polarized using 2% acetone solution of trichloroisocyanurate, coated with thermoplastic urethane added with carbon and dried.

The conductive roll thus obtained was left standing for one month in the laboratory. The initial roll resistance of $2.2\times10^5$ Ω became $2.3\times10^5$ Ω after one month, showing hardly any change. For comparison, a conductive roll made of identical materials and by the identical process but not polarized was also left standing for one month to measure the roll resistance. The initial resistance of $2.0\times10^5$ Ω changed drastically to $1.0\times10^6$ Ω.

The example indicates that chronological changes in the roll resistance can be avoided. In other words, firm bonding between the intermediate layer and the coated film layer prevents changes in the resistance caused by bleeding of the intermediate layer components onto the interstices which would otherwise be present if the bonding is not sufficient. Moreover, because displacement and warping of the coated film layer can be prevented when the coated film bonded to the intermediate layer, clear is and accurate image reproduction is possible.

The twelfth embodiment of a conductive roll according to the present invention will now be described.

The coated film layer of the embodiment is made of a polymer of one-component or two-component urethane, particularly urethane having as its main chain an ester of adipic acid.

The intermediate layer of the twelfth embodiment was obtained by kneading polybutadiene, liquid polyisoprene, carbon black and a vulcanizing agent, and then injection-molding the resultant mixture. The resultant layer was treated with 2% acetone solution of trichloroisocyanurate, coated with a thermoplastic urethane paint dispersed with carbon (P22S by Nippon Miractran), and dried to form a coated film layer of 4 μm thickness.

Using the conductive rolls thus obtained and a photosensitive member comprised mainly of polycarbonate, cracking due to stress corrosion was measured. In the conductive roll coated with urethane film no cracking occurred when tightly contacted with the photosensitive member for more than 20 days, whereas in the conductive roll comprising the intermediate layer alone cracking occurred in the photosensitive member within eight hours.

The above experiment indicates that urethane film becomes partially crystallized to enhance the strength and becomes firmly bonded with the intermediate layer or the rubber roll. The urethane film also has high dielectric strength and exhibits it even when the resistance is adjusted to be in the range equivalent to semiconductors using o carbon or conductive metal oxides. Using an ester of adipic acid particularly enhances the dielectric strength.

The thirteenth embodiment of a conductive roll according to the present invention will now be described.

The coated film layer in this embodiment comprises one-component urethane paint of ester base which is dispersed with DBP having the oil absorption of 130 to 50. Experiments conducted by the inventors have demonstrated that the coated film layer of this construction is particularly stable in terms of resistance.

The form of the coated film layer of this embodiment, 100 PHR of one-component polyurethane (P22S by Nippon Miractran) in which the chains of 1,4-butanediol and ester of adipic acid were extended using MDI (4,4-diphenyl-methane diisocyanate) were dissolred in 16% dioxane/methyl ethyl ketone (MEK)(50/50), to which 18 PHR of carbon (MA100 by Mitsubishi Chemical Industries) having the mean grain size of 22 μm, DBP absorption of 100 ml/100 g and pH of 3.5 were added to obtain a paint. The intermediate layer of this embodiment was halogenated using trichloroisocyanurate solution, coated with said paint for the thickness of approximately 200 μm and dried at 120° C. for five hours.

Several sheets of film of 100 μm thickness were prepared from the paint used in this embodiment to form the coated film layer, dried at 120° C. for five hours, and measured of their volume resistivity. The volume resistivity of the films was found to fall within a limited range of from $6.0\times10^8$ to $8.0\times10^8$ with good reproducibility. Dielectric strength test was conducted on the conductive rolls coated with said paint by applying DC voltages while rotating the rolls. It was confirmed that at 2.0 KV, the roll would not show voltage breakdown, indicating that the roll had the dielectric strength characteristics of at least 2 KV or higher.

The fourteenth embodiment of a conductive roll according to the present invention will now be described.

The coat ed film in this embodiment contains hydrophobic silica. This was confirmed to restrict environment dependent changes in the resistance as shown in Table 8 below.

The intermediate layer in this embodiment is a rubber roll which was obtained by injection-molding a mixture of polybutadiene, liquid poly isoprene and carbon black. The conductive roll according to this embodiment includes an intermediate layer which was treated with acetone solution of trichloroisocyanurate. The outer periphery of the intermediate layer was coated with a thermoplastic urethane paint added with carbon containing 10 PHR of hydrophobic silica (SS10 by Nippon Silica) and dried.

TABLE 3

| | Roll resistance (Ω) | |
|---|---|---|
| | 10% RH at 15° C. | 85% RH at 32.5° C. |
| Embodiment (containing hydrophobic silica) | $2.6\times10^6$ | $6.0\times10^5$ |
| Comparative embodiment (containing no hydrophobic silica) | $5.0\times10^5$ | $6.0\times10^5$ |

The fifteenth embodiment of a conductive roll according to the present invention will now be described.

The coated film in this embodiment contains tin oxides which in turn are doped with antimony oxides or highly conductive titanium oxides were. Use of highly conductive tin oxide was found to give the following advantages.

(1) As tin oxides or titanium oxides have an excellent dispersing property because of its very small grain size of 0.3 μm or smaller, the resistance of resultant coated film layer can be eas ily controlled by adequately varying the amount of dispersion.

(2) As grains of tin oxides or titanium oxides are spherical, the film resistance will show less shear dependent anisotropy during processing. The resultant conductive roll will therefore have better characteristics.

The inventors conducted experiments using the conductive roll of this embodiment and conductive rolls having the coated films made of various other materials as the charging roll in the actual laser beam printer. Table 4 shows the result of experiment.

TABLE 4

| Composition of the coated film | Result of experiment |
|---|---|
| Containing conductive tin oxides | Roll resistance can be easily adjusted to values at which dark lines or dark spots would not easily occur in the images. |
| Containing conductive titanium oxides | The above effect is obtained with some difficulties. |
| Containing conductive zinc oxides | The above effect is hardly achieved, making practical application impossible. |
| Containing carbon | The above effect cannot be achieved because carbon easily becomes oriented, making practical application impossible. |

A comparison was made between the case wherein the upper layer of the two-layer coated film was coated with a modified nylon added with tin oxides or titanium oxides and the case wherein the upper layer was coat ed with a modified nylon added with a substance other than tin oxides. A result similar to those shown in Table 4 was obtained.

The sixteenth embodiment of a conductive roll according to the present invention will now be described.

The coated film layer of this embodiment is made of a modified nylon of which degree of crosslinking is set by considering adhesion to the photosensitive drum, brittleness and high dielectric strength of the roll.

This embodiment layer is made of N-methoxymethyl nylon (Tresin EF30T by Teikoku Chemical InduStries) as the modified nylon. Others such as copolymerized N-methoxymethyl nylon (Tresin G550 by Teikoku Chemical Industries), modified copolymer amide (AQ Nylon P-70 by Toray Industries), polyether-polyester copolymerized softening nylon (Pebax 2533, 3533 by Toray Industries) may also be used.

Modified nylons such as N-methoxymethyl copolymer nylon to be used in this embodiment are suitable for the upper layer of the coated film, but are defective in that (1) if they are not crosslinked at all, they easily stick to the photosensitive drum, (2) if they are crosslinked too much, the resultant layer becomes too brittle and easily worn with cracks, and (3) the electric resistance of the layer tends to become too high despite addition of conductive powder.

Various studies and experiments by the inventors revealed that by adequately controlling the degree of crosslinking of the coated film layer, for example by using an acidic catalyst or by heating, defects mentioned above could be significantly improved.

A photosensitive drum bonded with the substance identical to N-methoxymethyl copolymer nylon used in the present embodiment was left standing for one month, but no contamination of the drum was observed.

The coated film layer in this embodiment is structured in two layers.

The upper layer is made of a material which will not contaminate the photosensitive drum upon contact therewith and is coated on the outer periphery of the lower layer for the thickness of 3 to 50 μm. It is particularly noted that a modified nylon similar to that used in the seventh embodiment was used in this embodiment. The upper layer is made thinner than the lower layer, so that the material for the upper layer may be harder in texture and lower in the dielectric strength.

The lower layer is made of a material which is soft similar to the seventh embodiment and has excellent dielectric characteristics, and which will not permit permeation of substances contained in the rubber or foaming substance of the intermediate layer to contaminate the photosensitive drum. The lower layer is formed on the outer periphery of the intermediate layer for the thickness of 50 to 200 μm. That is, a soft thermoplastic urethane with JISA hardness of approximately 80 is used to form thelower layer. As a result, the resultant conductive roll has excellent dielectric characteristics and does not permit permeation of substances contained in the rubber of intermediate layer or the foaming material onto the photosensitive drum to contaminate the same.

Thus, according to the seventeenth embodiment, because the upper and lower layers are each assigned the different functions, materials used in either layers can be selected from a much wider range.

It was found out that when a one-component urethane paint dispersed with carbon was used to form the lower layer, charging in the axial direction of the area with pinholes on photosensitive drum could not be achieved satisfactorily because of the orientation of carbon in the axial direction, to thereby cause dark lines in the images, although use of carbon was effective in controlling the roll resistance at a predetermined value. This phenomenon was found to easily occur when the roll resistance was set at a low value ($3\times10^5$ Ω or lower) to overcome the environment dependent changes or increase in the roll resistance when connected to the power source. Upon repeated experiments by the inventors, dark lines could be eliminated when resin dispersed with conductive tin oxides was coated to a thickness of 8 to 20 μm subsequent to coating the one-component urethane paint. This is attributable to the fact that there is hardly any orientation of tin oxides because of its fine spherical grains. Although tin oxides is far more expensive than carbon, use of expensive but high performance tin oxides in the thin upper layer to 30 μm) on top of the lower layer made of an inexpensive material such as carbon would result in an inexpensive conductive roll with high performance.

For particularly high dielectric strength characteristics, it is necessary to increase the roll resistance in the lower layer alone ($3\times10^5$ Ω). However, this leads to environment dependent in the roll resistance. By setting the resistance of the upper layer at a value lower than that of the lower layer, environment dependent change of the resistance, particularly humidity dependent changes, can be significantly reduced. In case the resistance of thelower layer alone is as low as $2\times10^5$ Ω or less, environment dependent changes will not occur even if the upper layer does not have a lower resistance than the lower layer. Although a urethane paint mixed with a conductive power shows a higher resistance at a higher humidity, a modified nylon blended with a conductive powder shows a decrease in the resistance at higher humidity. Thus, the two-layer structure of the coated film layer comprising the lower layer of urethane and the upper layer of modified nylon particularly advantageous as it decrease the environment dependence of the roll resistance.

The method of manufacuturing the conductive roll according to the first embodiment of the present invention will now be described referring to FIGS. 15 through 21.

Figure 15:
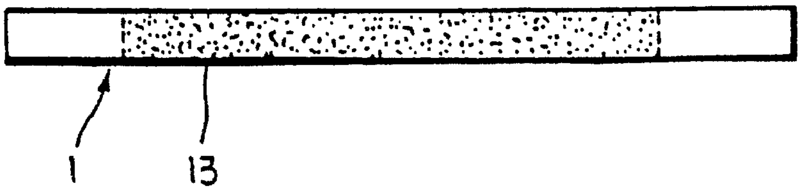
FIGS. 15 through 21 are the views to show the process of manufacturing the conductive roll according to the present invention.

(1) A metal shaft 1 having the outer diameter of 8 mm is coated with conductive adhesive 13 (FIG. 15). This is to obtain film bonding between the shaft 1 and the rubber roll 2, to improve the durability under rotational forces, to obtain uniform contact resistance between the shaft 1 and the rubber roll 2, and to reduce fluctuations in the electric resistance of the roll.

Figure 16:
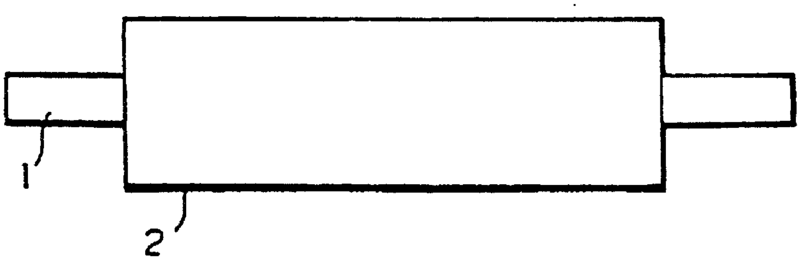

(2) The rubber roll 2 measuring 15 mm in outer diameter is then formed and vulcanized by injection-molding or extrusion molding around the shaft 1 (FIG. 16). As the material for the rubber roll, solid rubber is mixed with liquid rubber as a softening agent to prevent filling oil from being dissolved in the solvent of the coating material, and blended with a conductive material.

Figure 17:
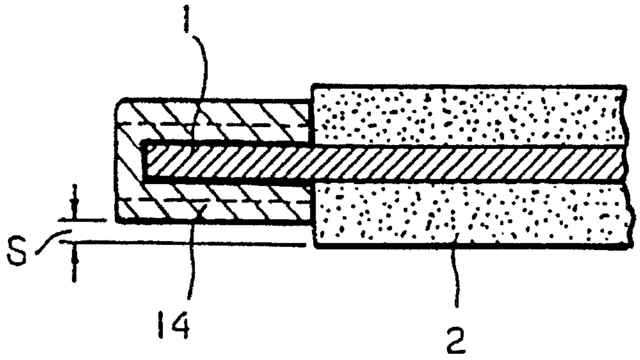

(3) A cap 14 made of polypropyrene and measuring 6 mm in inner diameter and 9 mm in outer diameter is inserted over either end of the shaft 1 (FIG. 17). The tube 14 is preferably made of a material which does not contaminate the coating solution and which resilently supports the shaft. To prevent pinholes, it is desirable that a difference of 0.5 mm or more, maintained between the rubber roll 2 and the tube 14. In order to provide a step S as a sump, a difference of 0.25 mm or more is desirably maintained.

(4) To remove foreign substances on the surface of the rubber roll 2, the surface is washed with pure water, methanol or toluene, and dried.

(5) To bond the rubber roll 2 and the coated film 3, the surface of rubber roll 2 is polarized using an organic halogenating agent or halogen gas. Even a trace of an air layer between the rubber roll 2 and the coated film 3 would deteriorate the dielectric strength characteristics and produce fluctuations in the electric resistance. It is essential that the coated film layer 3 is firmly bonded with the rubber roll 2.

Figure 18:
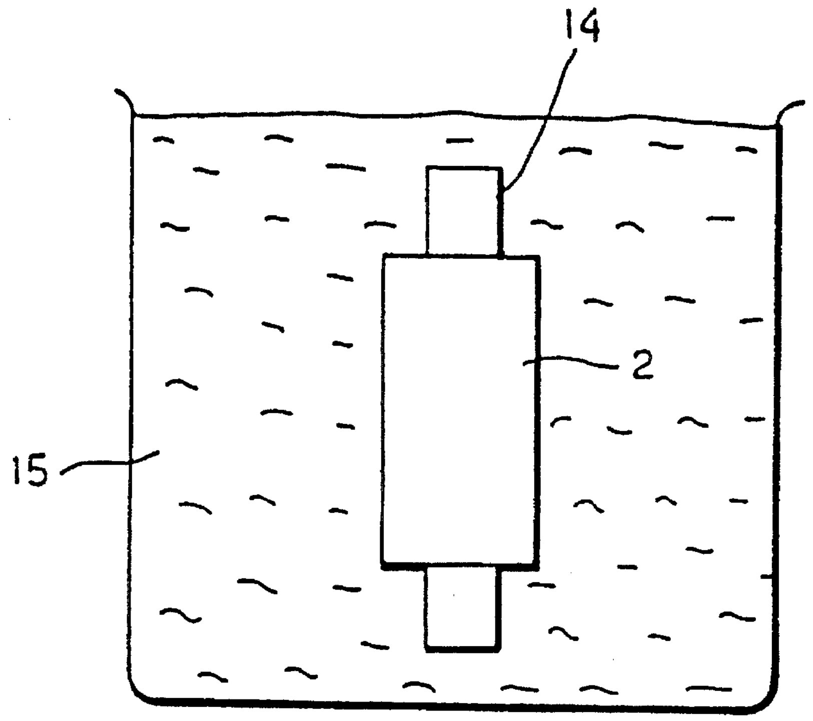

(6) While being supported at one end, the rubber roll 2 is erected upright and dipped in a coating solution 15 (FIG. 18). Conductive urethane is a particularly suitable coating material which contains as the conductive material graphite or metal oxides that are made conductive, such as titanium oxide, zinc oxides or tin oxides. Such urethane coating is soft and becomes firmly bonded with the rubber roll 2 whose surface is halogenated. Other materials such as acrylic rubber, epichlorohydorin rubber and nylon may also be used. In case a foaming material is used, it is more preferable to use a roll coater, knife coater or the like that can be used for coating solutions of relatively high viscosity.

Figure 19:
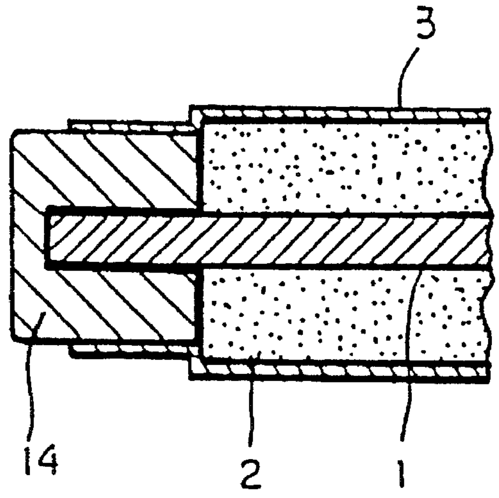
Figure 20:
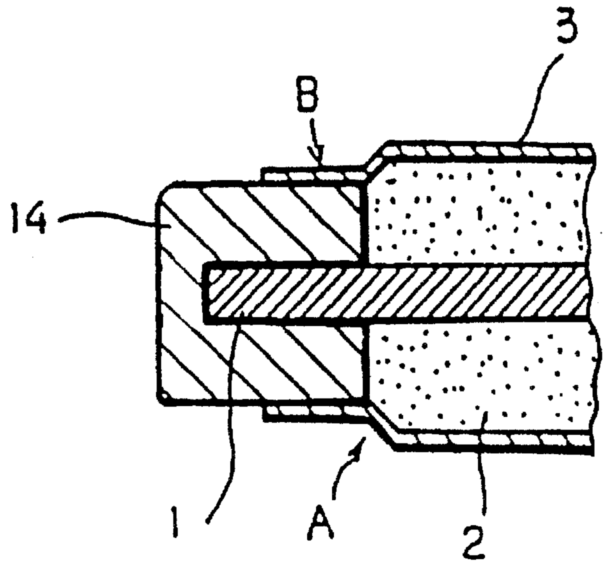

(7) As the rubber roll 2 and the tube 14 for masking are heat ed and dried, the configration of the roll end changes from that of FIG. 19 to that of FIG. 20 due to contraction of the coated film to form a fillet A. The fillet A acts to improve the dielectric strength characteristics of the roll end as mentioned above. In case the rubber roll is dipped in the coating solution by turning the same, the difference in the outer diameter between the rubber roll and the tube is preferably less than 2.5 mm because there may occur unevenness in the coated film 3 thickness as the excess coating solution adhered on the rubber roll may drip down along the sides of the rubber roll during drying.

Figure 21:
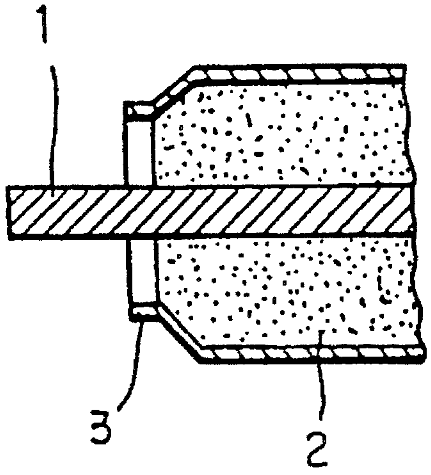

(8) Finally, a cut is made along the entire circumference of the coated film 8 at the portion marked as B with a knife (FIG. 20) to remove the masking cap (FIG. 21).

Field of Industrial Application

As has been described above, the present invention conductive roll is highly useful for developing images, charging, destaticizing, transferring or the like in an electrophotographic recording device, particularly as a means to charge or destaticize the potential from a photosensitive member in a copying machine.

What we claim:

1. A conductive roll comprising a conductive shaft provided at a core, an intermediate layer provided on an outer periphery of said shaft and having means for imparting electrical conductivity and having elasticity, and a coated film layer provided on the outer periphery of said intermediate layer and having a resistivity higher than that of the intermediate layer, and said intermediate layer is made of a non-foamed or foamed elastic member selected from the gorup consisting of silicone rubber, urethane rubber, polybutadiene base urethane rubber, polynorbornane rubber, natural rubber, polybutadiene rubber, polyisoprene rubber, styrene butadiene rubber, acrylonitrile rubber, ethylene propylene diene rubber, acrylic rubber, epichlorohydrin rubber, ethylene vinyl acetate rubber, fluororubber and mixtures thereof.

2. The conductive roll as claimed in claim 1 wherein said intermediate layer is a conductive, rubber member comprising an elastic material admixed with carbon black having a lesser structure.

3. The conductive roll as claimed in claim 1 wherein a surface of the intermediate member is polarized.

4. The conductive roll as claimed in claim 1 wherein the surface of the intermediate member is polarized and the coated film layer is polarized.

5. The conductive roll as claimed in claim 1 wherein said coated film layer is a polymer using one of a one-component and a two-component urethane.

6. The conductive roll as claimed in claim 1 wherein said coated film layer contains one of a one-component and a two-component urethane and carbon having a lower structure.

7. The conductive roll as claimed in claim 1 wherein said coated film layer comprises hydrophobic silica.

8. The conductive roll as claimed in claim 1 wherein said coated film layer contains tin oxide doped with antimony oxide.

9. The conductive roll as claimed in claim 1 wherein the coated film layer comprises a modified nylon.

10. The conductive roll as claimed in claim 1 wherein said coated film layer has a two-layer structure comprising an upper layer and a lower layer.

11. The conductive roll as claimed in claim 10 wherein said upper layer is a modified nylon.

12. The conductive roll as claimed in claim 10 wherein said upper layer contains tin oxide doped with antimony oxide.

13. The conductive roll as claimed in claim 10 wherein said lower layer is a polymer using one-component or two-component urethane.

14. The conductive roll as claimed in claim 10, wherein said upper layer is 1 to 20 μm thick and said lower layer is 5 to 20 μm thick and the ratio between a resistance $R_1$ of said upper layer and a resistance $R_2$ of said lower layer is larger than 1.

15. The conductive roll as claimed in claim 10, wherein said lower layer is one of a one-component urethane and a two-component urethane and said upper layer is a modified nylon.

16. The conductive roll as claimed in claim 10, wherein said upper layer is harder and thinner than said lower layer and said lower layer is softer and thicker than said upper layer.

17. The conductive roll as claimed in claim 10, wherein said intermediate layer is halogenated.

* * * * *